United States Patent
Nusser

[11] Patent Number: 6,127,531
[45] Date of Patent: Oct. 3, 2000

[54] MONOAZO REACTIVE DYES

[75] Inventor: Rainer Nusser, Neuenberg, Germany

[73] Assignee: Clariant Finance (BVI) Limited, Tortola, Virgin Islands (Br.)

[21] Appl. No.: 09/320,231

[22] Filed: May 26, 1999

[30] Foreign Application Priority Data

May 30, 1998 [GB] United Kingdom .................. 9811548

[51] Int. Cl.⁷ .......................... C09B 62/085; C09B 62/09; C09B 62/245; C09B 62/51
[52] U.S. Cl. ........................... 534/634; 534/635; 534/638; 534/797; 534/803
[58] Field of Search .................................... 534/634, 635, 534/638, 797, 803

[56] References Cited

U.S. PATENT DOCUMENTS 4,686,286  8/1987  Niwa et al. ............................. 534/637
5,410,041  4/1995  Muller ................................. 534/634 X

FOREIGN PATENT DOCUMENTS 62-132968  6/1987  Japan .

OTHER PUBLICATIONS

Vashi et al., Chemical Abstracts, 124:59062, 1995.

*Primary Examiner*—Fiona T. Powers
*Attorney, Agent, or Firm*—Scott E. Hanf; Hesna J. Pfeiffer

[57] ABSTRACT

A dyestuff according to formula (I)

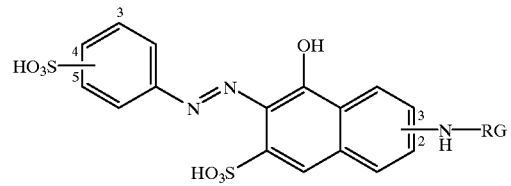

(I)

or a salt thereof wherein the substituents have the definitions as defined in claim 1.

The dyestuffs are useful for dyeing or printing nitrogen-containing or hydroxy-group-containing organic substrates and for the production of printing inks.

9 Claims, No Drawings

MONOAZO REACTIVE DYES

This invention relates to dyestuffs for cellulosic materials, in particular mono-azo fiber-reactive dyestuffs of the phenyl-azo-naphthalene series and corresponding direct dyestuffs which can be used for dyeing paper, cotton and similar textile materials.

Fiber-reactive dyestuffs of the phenyl-azo-naphthalene series are known. Dyestuffs of this series are water soluble and exhibit the requisite fastness to light, moisture and oxidative influences to make them suitable for use as fiber-reactive dyestuffs for dyeing textile materials made from wool and natural or regenerated cellulose.

Nevertheless, in order to keep pace with the demands of the textile industry, there is a need for fiber-reactive dyestuffs which show improved fastness properties and in particular light-fastness properties.

Surprisingly, we have now found that fiber-reactive dyestuffs of the phenyl-azo-naphthalene series having a specific substitution pattern on the phenyl radical of the diazo component display improved light-fastness properties and that the corresponding direct dyestuffs can be used for dyeing paper.

According to the invention a dyestuff according to formula (I)

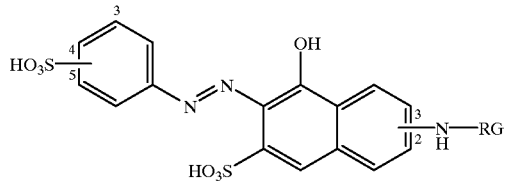
(I)

or a salt thereof, wherein the sulphonic acid group can be in 3-, 4-, or 5-position of the phenyl ring, preferably in the 4-position, and RG, which is bonded in the 2- or 3-position of the naphthalene ring, signifies

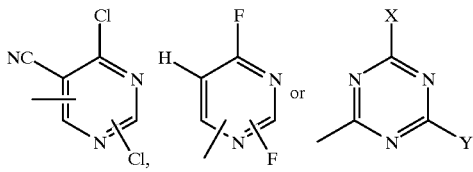

wherein X and Y, independently from each other are a substituent which is selected from Cl, F, an amino group of the formula —$NR_4R_5$ wherein $R_4$ and $R_5$ are independently hydrogen or $C_{1-4}$alkyl, optionally substituted by OH, COOH or $SO_3H$ or a group A—$SO_2$—B wherein A is a divalent group selected from $C_{2-3}$alkylene, $C_{5-8}$cycloalkylene or phenylene and B is a group selected from —CH=$CH_2$, —CH=CH—Z, —$CH_2CH_2$—Z or —CH($CH_2$Z)—$CH_2$Z wherein Z is a group removable by alkali or $R_4$ and $R_5$ together with the nitrogen atom to which they are connected are a heterocycle having 4 to 8 carbon atoms optionally containing another hetero-atom selected from O, N or S or X has one of the meanings indicated above and Y signifies a radical of formula (Ia)

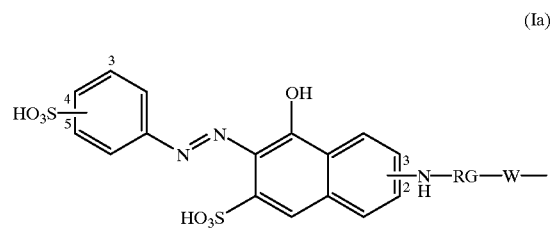
(Ia)

wherein W is divalent bridge and all the substituents have the same definition as defined above with the proviso that W connects two identical radicals, is claimed:

A preferred compound has the formula (II)

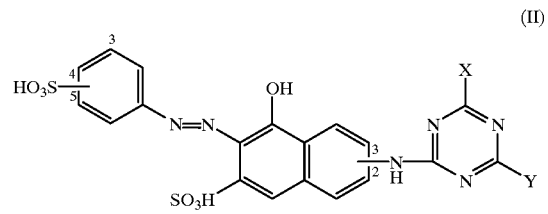
(II)

wherein X is chlorine or fluorine, Y is —$NR_4R_5$ and $R_4$ and $R_5$ are together with the nitrogen atom to which they are connected a heterocycle having 4 to 8 carbon atoms optionally containing another hetero-atom selected from O, N or S; or $R_4$ is hydrogen or $C_{1-4}$alkyl and $R_5$ is $C_{1-4}$alkyl or phenyl which both can be substituted by hydroxy, methyl or $SO_3H$, or $R_5$ is a group —A—$SO_2$—B as defined above.

In particularly preferred compounds according to formula (II) X is chloro or fluoro and Y is the —$NR_4R_5$ radical defined as β-(β'-(β''-Chloroethyl-sulphonyl)-ethoxy)-ethylamino, 2-methylphenylamino, β-Sulphoethylamino, γ-(β'-sulphoethylsulphonyl)-propyl-amino, morpholino, ethylamino, γ-(β'-sulphatoethylsulphonyl)-propylamino, methylarnino, Bis N,N-(γ-(β'-sulphatoethylsulphonyl)-propyl)-amino, Bis N,N-(β-(β'chloroethylsulphonyl)-ethyl)-amino, N-phenyl-N-(β-(β'-sulphatoethylsulphonyl)-ethyl)-amino and N-phenyl-N-(γ-(β'-sulphatoethylsulphonyl)-propyl)-amino.

In most preferred compounds according to formula (II) X is fluoro and Y is —$NR_4R_5$ as morpholino.

In another preferred embodiment according to the invention there is provided a compound according to the formula (III)

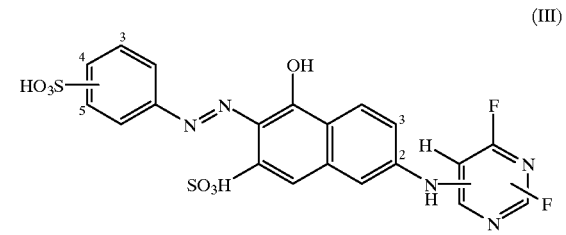
(III)

wherein the difluoropyrimidine radical is attached at the 2 position to the naphthyl ring.

In another preferred embodiment according to the invention there is provided a compound according to the formula IV

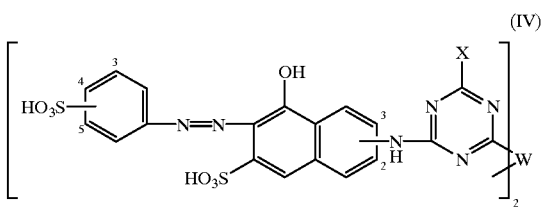

(IV)

wherein X is as defined above for the formula (I) and W is a divalent bridge, preferably $C_{1-6}$alkylene or phenylene.

In a more preferred compound according to formula (IV), X is chlorine, fluorine or —$NR_4R_5$ and $R_4$ as well as $R_5$, independently from each other, are hydrogen, $C_{1-4}$alkyl, optionally substituted by OH, COOH, $SO_3H$; $C_{5-8}$cycloalkyl; phenyl, optionally substituted by $C_{1-4}$alkyl, $SO_3H$ and/or $NH_2$; naphthyl, substituted by 1 to 3 $SO_3H$ groups.

The dyestuffs according to the invention are formed by introducing into a dyestuff or dyestuff precursor by known methods a pyrimidine radical or a triazinyl radical. The reaction is effected by contacting an active hydrogen atom of an amine group connected to the naphthalene ring with a reagent $R_g$—X wherein $R_g$ represents a pyrimidine radical or a triazinyl radical and X represents a halogen, e.g. F, Cl or Br. If a dyestuff precursor is used then it is converted into the new dyestuff in a known manner, e.g. by coupling the dyestuff precursor with a diazotised amine corresponding to the appropriately substituted phenyl radical of the new dyestuff.

When the dyestuff has a group which contains a substituent —$NR_4R_5$, that substituent may be already attached to $R_g$—X when carrying out the reaction with the aforementioned active hydrogen atom of the amine group. Alternatively, the substituent may be connected to $R_g$ after the reaction of $R_g$—X with the active hydrogen atom of the amine group, in which case reaction may be effected between a labile halogen atom on $R_g$ and an active hydrogen atom attached to N in $HNR_4R_5$.

The pyrimidine radical or the triazinyl radical is connected to the dyestuff or dyestuff precursor via a group —NH—, which group is derived from an amino-group having a reactive hydrogen atom and situated on the naphthalene ring of the dyestuff or dyestuff intermediate. The connection can be made by conventional chemistry.

The diazotisation reaction of the amine hereinabove mentioned may be carried out using conventional methods. In particular the reaction may be carried out in an aqueous medium at a temperature of from 0–10° C. and at a pH of from 0 to 2.

The coupling reaction is conventional and may be carried out in aqueous medium at a pH of from 5 to 9 preferably 6 to 8 and at a temperature of 10–40° C. preferably, 20–30° C.

The new dyestuff so formed can be purified by known techniques, e.g. by filtration, washing and drying optionally under vacuum and/or at elevated temperature.

Depending upon the methods of synthesis and purification, the new dyestuff can be obtained in free- or salt form. When the new dyestuff is obtained in salt form, the cation associated therewith is not critical and may be any one of those non-chromophoric cations conventional in the field of dyes provided that the corresponding salts are water-soluble. Examples of such cations are alkali metal cations and unsubstituted and substituted ammonium cations, e.g. lithium, sodium, potassium, ammonium, mono-, di-, tri- and tetra-methylammonium, tri-ethylammonium and mono-, di- and tri-ethanolammonium. The preferred cations are the alkali metal cations and ammonium, with sodium being the most preferred.

In a new dyestuff according to the invention, the cations can be the same or different, e.g., they can also be a mixture of the above mentioned cations meaning that the dyestuff can be in a mixed salt form.

The new dyestuff or mixtures thereof are for dyeing or printing hydroxy group- or nitrogen-containing organic substrates. Preferred substrates are leather and fiber material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the dyestuff field. It is preferred to effect dyeing of fiber-reactive dyestuffs using the exhaust dyeing method at temperatures within the range of 30–80° C., particularly at 50–60° C., and with a liquor to goods ratio of 6:1 to 30:1, more preferably of 10:1.

The new fiber-reactive dyestuff gives good exhaust and fixation yields when used as a dyestuff. Moreover, any unfixed compound is easily washed off the substrate. The dyeings and prints derived from the new fiber-reactive dyestuff exhibit good wet fastness properties such as wash, water, sea water and sweat fastness and in particular excellent light fastness. They also exhibit good resistance to oxidation agents such as chlorinated water, hypochlorite bleach, peroxide bleach and perborate-containing washing detergents.

The corresponding direct dyestuffs can be used as dyes directly or can be used in form of an aqueous, for example concentrated stabile solution, or in the form of their granulate in quaternary form and/or the mentioned salts of mineral acids or organic acids, for coloring fibers of all types, of cellulose, cotton or leather, particularly however paper or paper products.

The dyes can also be used in the production of pulp dyeing of bleached and unbleached paper. They can furthermore be used in dyeing paper according to the dip dyeing process.

The coloring of paper, leather or cellulose is carried out according to known methods.

The new dyes or preparations thereof, color the waste water resulting from paper production to practically no extent. This is important for the treatment of the waste water. They are highly substantive, do not mottle on dyed paper and are generally pH-insensitive. Dyeings on paper demonstrate good light fastness. The nuances change tone in tone after long periods of exposure to light.

The dyed papers are wet fast, especially noteworthy are the excellent alcohol fastness and soapy water fastness. Additionally, the reductive bleachability of the dyed papers is especially good.

The new dyestuffs can also be used in the preparation of printing inks which are suitable for the ink jet process.

There now follows a series of examples which serve to illustrate the invention. In these Examples all parts and all the percentages are by weight or volume, and the temperatures given are in degrees Celsius, unless indicated to the contrary.

EXAMPLE 1

47.8 parts of 2-amino-5-hydroxynaphthalene-7-sulfonic acid are stirred into 500 parts of water at 25° C. and are dissolved by the addition of 22 parts of a 30% by weight solution of sodium hydroxide. To this solution is added 26.8 parts of 2,4,6-trifluoropyrimidine dropwise over a 30 minute period. At the same time a 20% of sodium carbonate solution is added to this mixture continuously in order to maintain the pH of the mixture at 4–5. The reaction temperature is increased to 40–45° C. The end point of the reaction is determined using chromatographic techniques. The resultant suspension is cooled to 20–25° C. and poured onto a diazonium salt solution which is formed of 34.6 parts of 4-aminobenzene-sulfonic acid and 50 parts by volume of 4 N sodium nitrite solution at 0–5° C. and a pH of 1. During the coupling reaction the pH is maintained at 6–7 by continuously adding 20% sodium carbonate solution. The monoazo compound thus formed is salted-out using conventional methods, filtered and dried at 60° C. under vacuum. The product has the formula

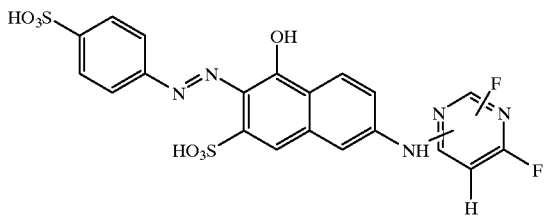

This product dyes cotton to an orange shade. The resultant dyeing displays excellent light and wet fastness properties and is resistant to oxidative influences.

EXAMPLE 2

A solution of 28.1 parts of 2-acetylamino-5-hydroxynaphthalene-7-sulfonic acid in 200 parts of water at 25° C. are mixed with a diazonium salt solution formed at 0–5° C. and a pH of 1 from a mixture of 17.3 parts of 3-aminobenzene-sulfonic acid and 25 parts by volume of 4 N sodium nitrite solution. During the coupling reaction the pH is maintained at 7–8 by the continuous adding of a 20% sodium carbonate solution. At the end of the reaction the product obtained is filtered and dried by suction. The still damp residue after suction filtration is dissolved in 300 parts of 4% by weight solution of sodium hydroxide and the resultant solution is heated to 90–100° C. until the saponification of the acetyl group is complete as determined by thin layer chromatography. The solution of the compound thus obtained having the following formula

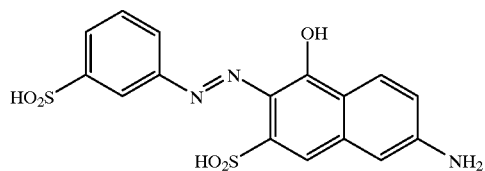

is cooled to 20° C. and by adding 30% hydrochloric acid the pH is adjusted to 5–6. At this pH 16.1 parts of 2,4,6-trifluoropyrimidine are added dropwise over a 30 minutes period. The pH of the solution is maintained by the continuous addition of 20% sodium carbonate solution and the temperature of the reaction mixture is maintained at 40–45° C. Upon completion of the reaction the resultant dyestuff is salted-out, filtered and dried at 60° C. under vacuum. The resultant dyestuff has the following formula

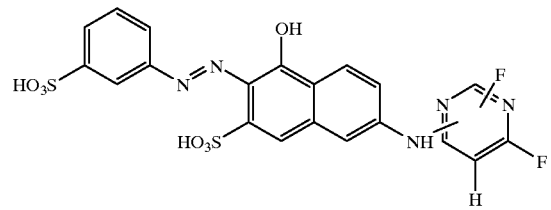

This dyestuff dyes cotton to an orange shade. Dyeings and prints thus obtained display excellent light and wet fastness properties and are stable to oxidative influences.

EXAMPLES 3–11

Table 1 discloses several dyestuffs which are formed according to methods analogous to those described in Examples 1 and 2 employing corresponding starting materials. In all cases the dyestuffs obtained dye or print cotton to an orange or red shade and dyeings thus obtained display excellent light and wet fastness properties and are stable to oxidative influences.

TABLE 1

EXAMPLES 3–11

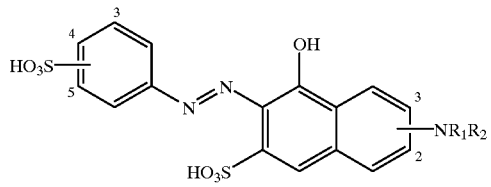

| Ex. | Pos. —SO$_3$H | Pos. —NR$_1$R$_2$ | R$_1$ | R$_2$ | Shade |
|---|---|---|---|---|---|
| 3 | 4 | 3 | H | ![F,F pyrimidine] | red |
| 4 | 3 | 3 | H | " | red |
| 5 | 4 | 2 | H | " | orange |
| 6 | 3 | 2 | H | " | orange |
| 7 | 4 | 2 | H | ![Cl,Cl,CN pyrimidine] | orange |
| 8 | 3 | 2 | H | " | orange |
| 9 | 4 | 2 | —CH$_3$ | " | orange |
| 10 | 4 | 2 | —CH$_3$ | " | orange |
| 11 | 4 | 3 | —CH$_3$ | ![F,F pyrimidine] | red |

EXAMPLE 12

142 parts of 2,4,6-trifluortriazine are added to a solution of 437 parts of a compound 1 obtained according to the process of Example 2 in 10000 parts of ice water according to a procedure described in EP-A-0 172 790. After approximately 30 minutes at 0–5° C., 87 parts of morpholine are added to the solution. The resultant solution is then stirred for a further 4–5 hours initially at 0–5° C. and thereafter at 10–15° C. The pH is maintained throughout at 6–7 with the continuous addition of appropriate quantities of a 20% sodium carbonate solution. Thereafter, 100 parts of KCl are added to precipitate the resultant dyestuff which is iltered and dried in a vacuum at 50° C. The dyestuff obtained has the formula

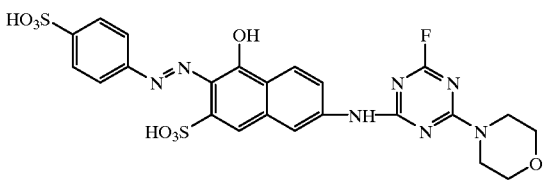

The dyestuff dyes cotton to an orange shade. The resultant dyeings and prints display good light- and wet-fastness properties and are stable to oxidative influences.

EXAMPLES 13–37

Tables 2 and 3 disclose several dyestuffs which are formed according to methods analogous to those described in Example 12 employing corresponding starting materials. In all cases the dyestuff obtained dye or print cotton to an orange or red shade and dyeings thus obtained display excellent light and wet fastness properties and are stable to oxidative influences.

TABLE 2

EXAMPLES 13–28

| Ex. | Pos. —SO₃H | Pos. —NH— | X | R₅ | R₆ | Shade |
|---|---|---|---|---|---|---|
| 13 | 4 | 2 | F | Ethyl | Phenyl | orange |
| 14 | 4 | 2 | Cl | Ethyl | o-tolyl (H₃C-phenyl) | orange |
| 15 | 4 | 3 | Cl | Ethyl | " | red |
| 16 | 4 | 3 | F | Methyl | —CH₂CH₂OH | red |
| 17 | 4 | 2 | F | H | tosyl-CH₂CH₂-O-SO₃H | orange |
| 18 | 4 | 2 | Cl | H | " | orange |
| 19 | 4 | 3 | Cl | H | " | red |
| 20 | 4 | 2 | Cl | H | m-substituted sulfonyl-CH₂CH₂-O-SO₃H | orange |
| 21 | 3 | 2 | Cl | H | " | orange |
| 22 | 3 | 2 | F | H | tosyl-CH₂CH₂-O-SO₃H | orange |

TABLE 2-continued

EXAMPLES 13–28

| Ex. | Pos. —SO$_3$H | Pos. —NH— | X | R$_5$ | R$_6$ | Shade |
|-----|---------------|-----------|---|-------|-------|-------|
| 23 | 4 | 2 | F | Ethyl | " | orange |
| 24 | 4 | 2 | F | H | H | orange |
| 25 | 3 | 2 | F | Methyl | —CH$_2$SO$_3$H | orange |
| 26 | 4 | 2 | F | H | —(CH$_2$)$_2$SO$_2$CH$_2$CH$_2$Cl | orange |
| 27 | 4 | 2 | F | H | 4-methylphenyl-SO$_3$H | orange |
| 28 | 4 | 2 | F | H | 2,5-disulfo-4-methylphenyl | orange |

TABLE 3

EXAMPLES 29–37

| Ex. | Pos. —SO$_3$H | Pos. —NH— | X | W | Shade |
|-----|---------------|-----------|---|---|-------|
| 29 | 4 | 2 | Cl | —NHCH$_2$CH$_2$NH— | orange |
| 30 | 4 | 2 | F | " | orange |
| 31 | 3 | 2 | F | —NHC(CH$_3$)CH$_3$NH— | orange |
| 32 | 4 | 3 | F | " | red |
| 33 | 4 | 2 | F | —NHCH$_2$C(CH$_3$)CH$_2$CH$_2$CH$_2$NH— | orange |
| 34 | 4 | 2 | Cl | —N(CH$_3$)CH$_2$CH$_2$NH— | orange |
| 35 | 4 | 2 | Cl | —NH—(1,4-phenylene)—NH— | orange |
| 36 | 3 | 3 | Cl | " | red |
| 37 | 4 | 2 | Cl | —NH—(1,3-phenylene)—NH— | orange |

EXAMPLE 38

A solution of 281 parts of 2-acetylamino-5-hydroxynaphthalene-7-sulfonic acid in 2000 parts of water at 25° C. are mixed with a diazonium salt solution formed at 0–5° C. and a pH of 1 from a mixture of 173 parts of 4-aminobenzene-sulfonic acid and 250 parts by volume of 4 N sodium nitrite solution. During the coupling reaction the pH is maintained at 7–8 by the continuous adding of a 20% sodium carbonate solution. At the end of the reaction the product obtained is filtered and dried by suction. The still damp residue after suction filtration is dissolved in 3000 parts of 4% by weight solution of sodium hydroxide and the resultant solution is heated to 90–100° C. until the saponification of the acetyl group is complete as determined by thin layer chromatography. At the end of the reaction the product obtained having the formula

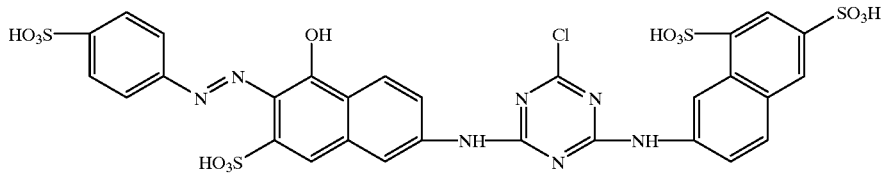

is filtered and dried by suction. The still damp residue after suction filtration is dissolved in 2500 parts of water of 45° C. mixed over the course of 30 minutes with 2000 parts of an aqueous suspension containing 405 parts of 2,4-dichloro-6-(6',8'-disulphonaphthyl-2)-aminotriazine, whereby the temperature is maintained at 40–45° C. and the pH is maintained at 7–7.5. As soon as the condensation has ended the resultant dyestuff having the formula is salted-out by conventional methods whilst cooling, filtered by suction and dried under vacuum at 50° C. The dyestuff dyes cotton to an orange shade. The resultant dyeings and prints display good light and wet fastness properties and are stable to oxidative influences.

EXAMPLE 39

84 parts of the dyestuff from Example 38 are stirred into 800 parts of water and mixed with 43 parts of diethanolamine. The mixture is subsequently heated to 80–90° C. and this temperature is maintained until the reaction is complete. The dyestuff solution is stirred until cold and the dyestuff obtained is salted-out, filtered and dried under vacuum at 60° C. The resultant dyestuff having the formula dyes cellulosic fibers and in particular paper in an orange shade. The wet and the light fastness properties are excellent.

EXAMPLES 40–70

Table 4 and 5 disclose several dyestuffs which are formed analogously to the procedure given in Examples 38–39. In all cases the dyestuff obtained dyes paper to an orange or red shade and dyeings thus obtained display excellent light and wet fastness properties.

TABLE 4

EXAMPLES 40–60

| Ex. | Pos. —SO₃H | Pos. —NH— | X | Y | Shade |
|---|---|---|---|---|---|
| 40 | 3 | 2 | —N(CH₂CH₂OH)₂ | 4-sulfo-methylphenyl | orange |
| 41 | 4 | 3 | " | " | red |
| 42 | 4 | 2 | —OH | " | orange |
| 43 | 4 | 2 | N-methylmorpholinyl | " | orange |
| 44 | 4 | 2 | —NHCH₂CH₂OH | 7-amino-1,3-disulfonaphthyl | orange |
| 45 | 4 | 3 | " | —NHCH₂CH₂OH | red |
| 46 | 3 | 3 | —NHCH₂COOH | 7-amino-1,3-disulfonaphthyl | red |
| 47 | 3 | 2 | —NHCH₂CH₂SO₃H | 3-sulfo-methylphenyl | orange |
| 48 | 4 | 2 | —N(CH₃)CH₂CH₂SO₃H | —N(CH₃)CH₂CH₂SO₃H | orange |
| 49 | 4 | 2 | —NHCH₂COOH | 7-amino-1,3,5-trisulfonaphthyl | orange |
| 50 | 4 | 2 | —NH₂ | " | orange |

TABLE 4-continued
EXAMPLES 40–60
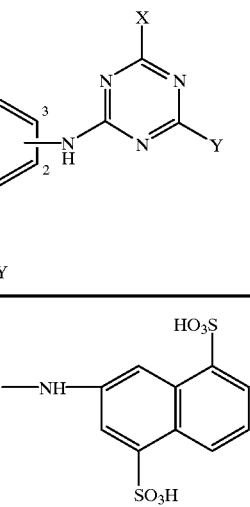
| Ex. | Pos. —SO₃H | Pos. —NH— | X | Y | Shade |
|---|---|---|---|---|---|
| 51 | 3 | 2 | " | 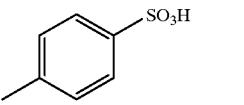 | orange |
| 52 | 4 | 2 | " | —NH₂ | orange |
| 54 | 4 | 2 | " | (4-methylphenyl-SO₃H) | orange |
| 55 | 4 | 3 | " | " | red |
| 56 | 4 | 2 | —NH(CH₂)₃OCH₃ | " | orange |
| 57 | 4 | 2 | —NHCH₂CH₂SO₃H | " | orange |
| 58 | 4 | 2 | " | —NHCH₂CH₂SO₃H | orange |
| 59 | 4 | 2 | —NH₂ | (methyl-disulfonic phenyl) | orange |
| 60 | 4 | 2 | —OH | " | orange |
TABLE 5
EXAMPLES 61–70
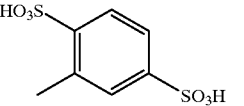
| Ex. | Pos. —SO₃H | Pos. —NH— | X | W | Shade |
|---|---|---|---|---|---|
| 61 | 4 | 2 | —OH | —NHCH₂CH₂NH— | orange |
| 62 | 4 | 2 | —NHCH₂CH₂OH | " | orange |
| 63 | 3 | 2 | " | —NHC(CH₃)CH₂NH— | orange |
| 64 | 4 | 2 | —NH₂ | " | orange |

TABLE 5-continued

EXAMPLES 61–70

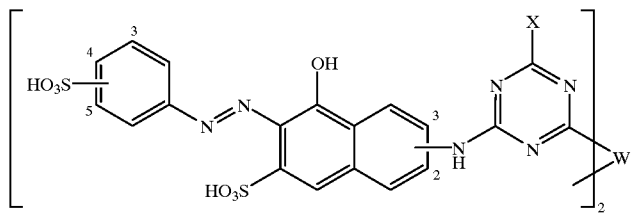

| Ex. | Pos. —SO$_3$H | Pos. —NH— | X | W | Shade |
|---|---|---|---|---|---|
| 65 | 4 | 3 | ![morpholine] | " | red |
| 66 | 4 | 2 | " | —NHCH$_2$C(CH$_3$)CH$_2$CH$_2$CH$_2$NH— | orange |
| 67 | 4 | 2 | —NHCH$_2$CH$_2$OH | —N(CH$_3$)CH$_2$CH$_2$NH— | orange |
| 68 | 4 | 2 | " | —NH—C$_6$H$_4$—NH— (para) | orange |
| 69 | 4 | 3 | —NH$_2$ | " | red |
| 70 | 3 | 2 | —NHCH$_2$CH$_2$OH | —NH—C$_6$H$_4$—NH— (meta) | orange |

APPLICATION EXAMPLE A 0.3 Part of the dyestuff of Example 1 is dissolved in 100 parts of demineralized water and 8 parts of Glauber's salt (calcined) are added. The dyebath is heated to 50° C., then 10 parts of cotton fabric (bleached) are added. During the addition of sodium carbonate the temperature is kept at 50° C. Subsequently, the dyebath is heated to 60° C., and dyeing is effected for a further one hour at 60° C. The dyed fabric is then rinsed with running cold water for 3 minutes and afterwards with running hot water for a further 3 minutes. The dyeing is washed at the boil for 15 minutes in 500 parts of demineralized water in the presence of 0.25 part of Marseille soaps. After being rinsed with running hot water (for 3 minutes) and centrifuged, the dyeing is dried in a cabinet dryer at about 70° C. An orange cotton dyeing is obtained showing good fastness properties, and particularly good light and wet fastness properties, which is stable towards oxidative influences.

APPLICATION EXAMPLE B

To the dyebath containing in 100 parts of demineralized water 5 parts of Glauber's salt (calcined), 10 parts of cotton fabric (bleached) are added. The bath is heated to 50° C. within 10 minutes, and 0.5 part of the dyestuff of Example 1 is added. After a further 30 minutes at 50° C., 1 part of sodium carbonate (calcined) is added. The dyebath is then heated to 60° C. and dyeing is continued at 60° C. for a further 45 minutes. The dyed fabric is rinsed with running cold and then hot water and washed at the boil according to the method given in Application Example A. After rinsing and drying an orange cotton dyeing is obtained which has the same good fastness properties as indicated in Application Example A.

Similarly, the dyestuff of Examples 2–37 or mixtures of the exemplified dyestuffs may be employed to dye cotton in accordance with the method described in Application Example A or B. The cotton dyeings thus obtained are orange or red and show good fastness properties, in particular light-fastness.

APPLICATION EXAMPLE C

A printing paste consisting of

| | |
|---|---|
| 40 | parts of the dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods. The printed fabric is dried and fixed in steam at 102–104° C. for 4–8 minutes. It is rinsed in cold and then hot water, washed at the boil (according to the method described in Application Example A) and dried. An orange print is obtained which has good general fastness properties.

Similarly, the dyestuffs of Examples 2 to 37 or mixtures of the exemplified dyestuffs may be employed to print cotton in accordance with the method given in Application Example C. All prints obtained are orange or red and show good fastness properties, in particular good light fastness properties.

APPLICATION EXAMPLE D 70 parts of chemically bleached sulphite cellulose of pinewood and 30 parts of chemically bleached sulphite cellulose of birchwood are ground in a Hollander in 2000 parts of water. 0.2 Parts of the dyestuff of Example 38 are sprinkled into this pulp. After mixing for 20 minutes, paper is produced therefrom. The absorbent paper obtained in this way is dyed orange. The waste water is practically colorless.

APPLICATION EXAMPLE E 0.5 parts of the dyestuff powder of Example 38 are dissolved in 100 parts of hot water and cooled to room temperature. The solution is added to 100 parts of chemically bleached sulphite cellulose, which have been ground in a Hollander with 2000 parts of water. After thorough mixing for 15 minutes, sizing takes place in the usual way with rosin size and aluminium sulphate. Paper which is produced from this material has an orange shade, and has good waste-water and wet fastness, as well as good light fastness.

APPLICATION EXAMPLE F

An absorbent length of unsized paper is drawn through a dyestuff solution of the following composition at 40–50° C.:

0.5 parts of the dyestuff of Example 38
0.5 parts of starch and
99.0 parts of water.

The excess dyestuff solution is squeezed out through two rollers. The dried length of paper is dyed orange.

Dyeing may also take place in a similar manner to that of Examples D to F using the dyestuffs of Examples 39 to 70, or resp. a dye preparation thereof. The paper dyeings obtained are orange or red and have a high level of fastness.

APPLICATION EXAMPLE G 50 parts of bleached pinewood sulphite cellulose and 50 parts of bleached beech cellulose (degree of beating 30° SR (° SR=Schopper Riegler degree )) are mixed with 0.5 parts of the dyestuff of Example 38 in water (pH 4, water hardness 10° dH). After 16 minutes, sheet formation takes place. The paper is dyed in an intense orange shade. In contrast, a dyeing made at pH 7 shows no variation in depth or shade.

APPLICATION EXAMPLE H 1.1 parts of the dyestuff of Example 38 are dissolved at 60° C. in 100 parts of demineralized water and subsequently diluted with 900 parts of cold, demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98° C. this temperature is maintained for 20 minutes and the dye bath is then cooled to 70° C. over the course of 30 minutes. The dyed material is rinsed for 2 minutes firstly with cold demineralized water and subsequently for 2 minutes with cold tap water, then centrifuged and dried. The cotton dyeing obtained has an orange shade.

APPLICATION EXAMPLE I 100 parts of cotton tricot, which have been dyed with the dyestuff of Example 38 analogously to the method of Example H in ca. 1/1 standard depth, are mixed without intermediate drying in 1000 parts of tap water at 25° C. with 5 parts of sodium chloride and 4 parts of an after-treatment agent obtained from the reaction of diethylenetriamine with dicyandiamide. The pH value of the dye bath is set at 6.5–7. The bath is heated to 60° C. over the course of 20 minutes, and this temperature is maintained for a further 20 minutes. Afterwards, the material is rinsed with cold tap water. The orange cotton dyeing which has been after-treated in this way has perfect washing fastness and very good light fastness.

APPLICATION EXAMPLE J

A cotton dying produced with the dyestuff of Example 38 analogously to the method of Example H in 1/1 standard depth, is impregnated on a padder with a solution, which contains 100 g/l of an after-treatment agent obtained by reacting the after-treatment agent of Example I with dimethyloldihydroxyethyleneurea and a hardening catalyst, and it is squeezed out to a pick-up of ca. 80%. It is subsequently shock-dried for 45 seconds on a stenter at a temperature of 175–180° C. The orange cotton dyeing thus obtained is notable for its perfect washing fastness. At the same time, there is a considerable improvement in the creasing fastness, and reduced swelling value of the cellulosic fibers.

APPLICATION EXAMPLE K 2.5 parts of the dyestuff obtained in Example 38 are dissolved with stirring at 25° C. in a mixture of 20 parts diethyleneglycol and 77.5 parts water to obtain a printing ink suitable for ink jet printing.

What is claimed is:

1. A dyestuff according to formula (I)

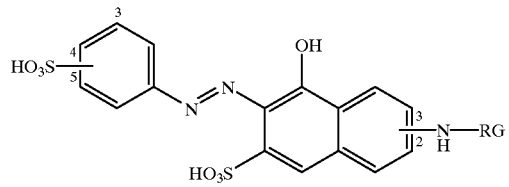

or a salt thereof, wherein the sulphonic acid group can be in 3- or 4- or 5-position of the phenyl ring, preferably in the 4-position, and RG, which is bonded in the 2- or 3-position of the naphthalene ring, signifies

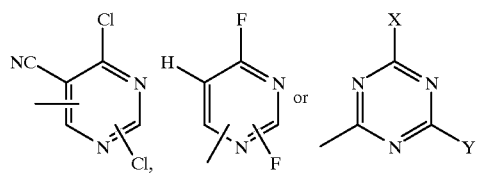

wherein X and Y, independently from each other are a substituent which is selected from Cl, F, an amino group of the formula —$NR_4R_5$ wherein $R_4$ and $R_5$ are independently hydrogen or $C_{1-4}$alkyl, optionally substituted by OH, COOH or $SO_3H$ or a group A—$SO_2$—B wherein A is a divalent group selected from $C_{2-3}$alkylene, $C_{5-8}$cycloalkylene or phenylene and B is a group selected from —CH=$CH_2$, —CH=CH—Z, —$CH_2CH_2$—Z or —CH($CH_2Z$)—$CH_2Z$ wherein Z is a group removable by alkali or $R_4$ and $R_5$ together with the nitrogen atom to which they are connected are a heterocycle having 4 to 8 carbon atoms optionally containing another hetero-atom selected from O, N or S or X is Cl or F and Y signifies a radical of formula (Ia)

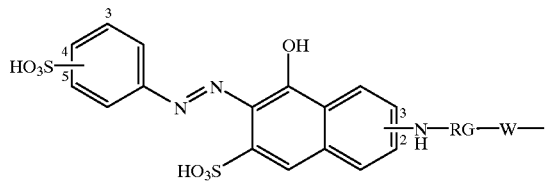
(Ia)

wherein W is $C_{1-6}$ alkylene and all the substituents have the same definition as defined above with the proviso that W connects two identical radicals.

2. A dyestuff according to claim 1 which corresponds to the formula (II)

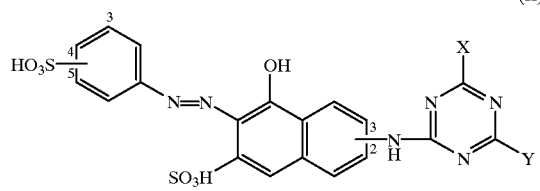
(II)

wherein X is chlorine or fluorine, Y is —$NR_4R_5$ and $R_4$ and $R_5$ are together with the nitrogen atom to which they are connected a heterocycle having 4 to 8 carbon atoms optionally containing another hetero-atom selected from O, N or S; or $R_4$ is hydrogen or $C_{1-4}$alkyl and $R_5$ is $C_{1-4}$alkyl or phenyl which both may be substituted by hydroxy, methyl or $SO_3H$, or $R_5$ is a group —A—$SO_2$—B as defined in claim 1.

3. A dyestuff according to claim 2 wherein X is fluoro and Y is the —$NR_4R_5$ radical defined as β-(β'-(β''-Chloroethyl-sulphonyl)-ethoxy)-ethylamino, 2-methylphenylamino, β-Sulphoethylamino, γ-(β'-sulphoethylsulphonyl)-propylamino, morpholino, ethylamino, γ-(β'-sulphatoethylsulphonyl)-propylamino, methylamino, Bis N,N-(γ-(β'-sulphatoethylsulphonyl)-propyl)-amino, Bis N,N-(β-(β'chloroethylsulphonyl)-ethyl)-amino, N-phenyl-N-(β-(β'-sulphatoethylsulphonyl)-ethyl)-amino and N-phenyl-N-(γ-(β'-sulphatoethylsulphonyl)-propyl)-amino.

4. A dyestuff according to claim 2 wherein X is chloro and Y is the —$NR_4R_5$ radical defined as β-(β'-(β''-Chloroethyl-sulphonyl)-ethoxy)-ethylamino, 2-methylphenylamino, β-Sulphoethylamino, γ-(β'-sulphoethylsulphonyl)-propylamino, morpholino, ethylamino, γ-(β'-sulphatoethylsulphonyl)-propylamino, methylamino, Bis N,N-(γ-(β'-sulphato-ethylsulphonyl)-propyl)-amino, BisN, N-(β-(β'chloroethylsulphonyl)-ethyl)-amino, N-phenyl-N-(β-(β'-sulphatoethylsulphonyl)-ethyl)-amino and N-phenyl-N-(γ-(β'-sulphatoethylsulphonyl)-propyl)-amino.

5. A dyestuff according to claim 3 wherein Y is the —$NR_4R_5$ radical as morpholino.

6. A dyestuff according to claim 1 which corresponds to the formula (III)

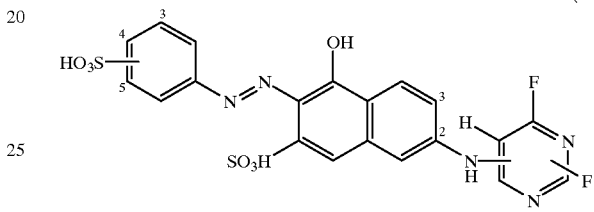
(III)

wherein the difluoropyrimidine is bonded to the 2 position of the naphthyl-ring.

7. A process of forming a dyestuff as defined in claim 1 comprising the step of reacting a dyestuff of the phenyl-azo-naphthalene series having a reactive amino-hydrogen atom with a reagent $R_g$—X wherein $R_g$ is a labile-halogen-containing pyrimidine or triazinyl radical and X is a halogen selected from F, or Cl.

8. A process of dyeing or printing hydroxy-group-containing or nitrogen-containing organic substrates comprising applying thereto a dyestuff according to claim 1.

9. A process for the preparation of printing inks comprising mixing a dyestuff according to claim 1 into an aqueous composition suitable for ink jet printing.

* * * * *